US010585191B2

(12) United States Patent
Hirano et al.

(10) Patent No.: US 10,585,191 B2
(45) Date of Patent: Mar. 10, 2020

(54) ULTRASONIC SENSOR AND VEHICLE CONTROL SYSTEM

(71) Applicants: NEW JAPAN RADIO CO., LTD., Tokyo (JP); AISIN SEIKI KABUSHIKI KAISHA, Kariya-shi, Aichi-ken (JP)

(72) Inventors: Nobumitsu Hirano, Tachikawa (JP); Hajime Fujiwara, Fujimino (JP); Kenji Takebuchi, Gunma-ken (JP); Hiroyuki Kuchiji, Saitama (JP); Akira Seshimoto, Saitama (JP); Kimiyoshi Yamasaki, Tokyo (JP); Kenichi Taguchi, Toyota (JP); Masaya Otokawa, Gifu (JP)

(73) Assignees: NEW JAPAN RADIO CO., LTD., Tokyo (JP); AISIN SEIKI KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 16/205,486

(22) Filed: Nov. 30, 2018

(65) Prior Publication Data
US 2019/0170872 A1 Jun. 6, 2019

(30) Foreign Application Priority Data

Dec. 4, 2017 (JP) .................. 2017-232726

(51) Int. Cl.
*G01S 15/00* (2020.01)
*G01S 15/04* (2006.01)
(Continued)

(52) U.S. Cl.
CPC ............ *G01S 15/04* (2013.01); *B06B 1/0215* (2013.01); *E05F 15/40* (2015.01); *E05F 15/73* (2015.01);
(Continued)

(58) Field of Classification Search
CPC ........ G01S 15/04; G01S 7/521; G01S 15/003; E05F 15/40; E05F 15/73; E05F 2015/763;
(Continued)

(56) References Cited

U.S. PATENT DOCUMENTS 4,114,146 A * 9/1978 Inoue .................... G01S 15/523
342/28
6,957,582 B1 * 10/2005 Durkee ............... G01F 23/2962
310/319
(Continued)

FOREIGN PATENT DOCUMENTS

JP 2004117137 A * 4/2004 ........... G01N 29/069
JP 2009-236776 A 10/2009

*Primary Examiner* — Zhen Y Wu
(74) *Attorney, Agent, or Firm* — Arent Fox LLP; Michael Fainberg

(57) ABSTRACT

An ultrasonic sensor in the invention includes an ultrasonic transmitter, an ultrasonic receiver, and a detector. The ultrasonic transmitter transmits pulse-shaped ultrasonic waves to a thin plate to excite the thin plate. The ultrasonic receiver receives direct waves and reflected waves among the ultrasonic waves propagating in the thin plate excited by the pulse-shaped ultrasonic waves, the direct waves propagating only in the thin plate, and the reflected waves radiating outward, then reflected by the object, and returning to the thin plate. The detector detects the object present near the thin plate on the basis of a difference between a time at which the ultrasonic receiver receives the direct waves and a time at which the ultrasonic receiver receives the reflected waves.

10 Claims, 13 Drawing Sheets

(51) Int. Cl.
*B06B 1/02* (2006.01)
*E05F 15/40* (2015.01)
*E05F 15/73* (2015.01)
*G01S 7/521* (2006.01)

(52) U.S. Cl.
CPC ............ *G01S 7/521* (2013.01); *G01S 15/003* (2013.01); *B06B 1/02* (2013.01); *B06B 2201/70* (2013.01); *E05F 2015/763* (2015.01); *E05Y 2400/53* (2013.01); *E05Y 2400/54* (2013.01); *E05Y 2900/531* (2013.01)

(58) Field of Classification Search
CPC ..... B06B 1/0215; B06B 1/02; B06B 2201/70; E05Y 2400/53; E05Y 2400/54; E05Y 2900/531
USPC ............................................... 340/93; 367/93
See application file for complete search history.

(56) References Cited

U.S. PATENT DOCUMENTS

| | | | |
|---|---|---|---|
| 7,882,742 B1* | 2/2011 | Martens | G01N 29/07 73/632 |
| 8,869,620 B2* | 10/2014 | Kimura | G01S 7/521 73/597 |
| 2002/0014787 A1* | 2/2002 | Yamamoto | B60J 5/0426 296/187.09 |
| 2007/0284813 A1* | 12/2007 | Schoen | B65H 7/02 271/278 |
| 2009/0243826 A1 | 10/2009 | Touge | |
| 2011/0239769 A1* | 10/2011 | Schmitt | G01B 17/025 73/632 |
| 2011/0271769 A1* | 11/2011 | Kippersund | G01F 1/42 73/861.28 |
| 2014/0230556 A1* | 8/2014 | Yamamoto | G01N 29/069 73/602 |
| 2015/0153313 A1* | 6/2015 | Kurashige | G01N 29/11 73/602 |
| 2015/0160167 A1* | 6/2015 | Kawasaki | G01N 29/069 73/598 |
| 2016/0039439 A1* | 2/2016 | Fahmy | B61L 27/0088 701/20 |
| 2016/0274062 A1* | 9/2016 | Takahashi | B23P 6/00 |
| 2016/0349922 A1* | 12/2016 | Choi | G06F 3/043 |
| 2017/0059697 A1 | 3/2017 | Esmail | |
| 2017/0248550 A1* | 8/2017 | Takahashi | G01N 29/2418 |
| 2019/0257792 A1* | 8/2019 | Appelquist | G01M 17/007 |

* cited by examiner

ULTRASONIC SENSOR AND VEHICLE CONTROL SYSTEM

CROSS-REFERENCE TO RELATED APPLICATIONS

The present application claims priority to and incorporates by reference the entire contents of Japanese Patent Application No. 2017-232726 filed in Japan on Dec. 4, 2017.

FIELD OF THE INVENTION

The present invention relates to an ultrasonic sensor and a vehicle control system.

BACKGROUND OF THE INVENTION

For safety improvement on automobiles and automatic driving of automobiles, various sensors such as millimeter-wave radars, infrared laser sensors, cameras, infrared cameras, and ultrasonic sensors are mounted on automobiles. Using those sensors, systems that detect and recognize obstacles around automobiles are being put into practical use. Ultrasonic sensors are particularly used for the sensors that are applied to parking assist systems to detect close-in objects (e.g., refer to Japanese Patent Application Laid-open No. 2009-236776). An example of the conventional ultrasonic sensors transmits ultrasonic waves having high directivity, detects reflected waves from an object (obstacle), and detects the object on the basis of a time period from the transmission of the ultrasonic waves to the reception of the reflected waves.

The conventional ultrasonic sensor uses ultrasonic waves having high directivity, resulting in a detectable range of an object being reduced. For example, when an object near a door of a vehicle is to be detected, a plurality of ultrasonic sensors need to be arranged two-dimensionally on the entire surface of the door. This structure increases a manufacturing cost and causes a problem of deterioration of an exterior design of the portion where the ultrasonic sensors are disposed.

The invention aims to provide an ultrasonic sensor that can prevent deterioration of an exterior design of a portion where the ultrasonic sensor is disposed while a manufacturing cost is reduced.

SUMMARY OF THE INVENTION

According to one embodiment, an ultrasonic sensor includes: an ultrasonic transmitter that transmits pulse-shaped ultrasonic waves to a thin plate to excite the thin plate; an ultrasonic receiver that receives direct waves and reflected waves among the ultrasonic waves propagating in the thin plate excited by the pulse-shaped ultrasonic waves, the direct waves propagating in only the thin plate, and the reflected waves radiating outward, then reflected by an object, and returning to the thin plate; and a detector that detects the object present near the thin plate on the basis of a difference between a time at which the ultrasonic receiver receives the direct waves and a time at which the ultrasonic receiver receives the reflected waves.

DETAILED DESCRIPTION OF THE PREFERRED EMBODIMENTS

The following describes embodiments of an ultrasonic sensor and a vehicle control system according to the invention in detail with reference to the accompanying drawings.

First Embodiment

Figure 1:
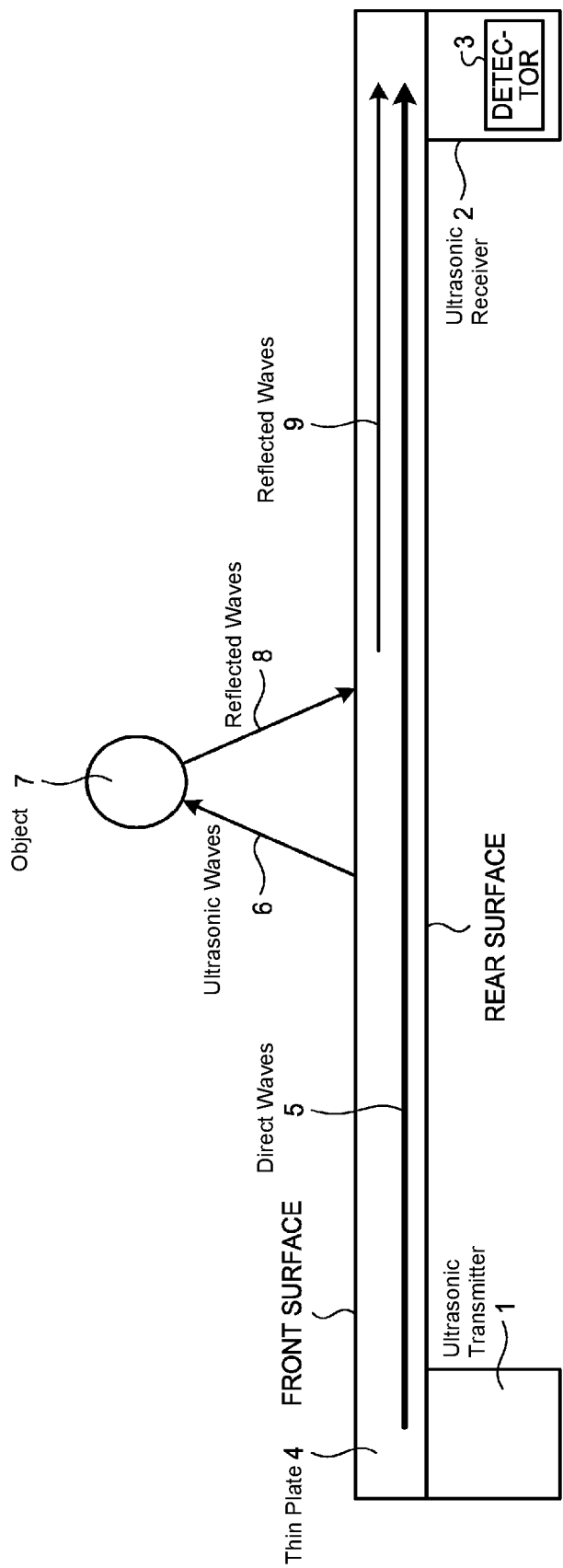
FIG. 1 is a schematic structural view of an ultrasonic sensor in a first embodiment.

FIG. 1 is a diagram for explaining an exemplary schematic structure of an ultrasonic sensor in a first embodiment. As illustrated in FIG. 1, the ultrasonic sensor includes an ultrasonic transmitter 1 and an ultrasonic receiver 2. The ultrasonic receiver 2 includes a detector 3.

The ultrasonic transmitter 1 transmits pulse-shaped ultrasonic waves to a thin plate 4 to excite the thin plate 4. The thin plate 4 is an exterior surface of a vehicle (e.g., an automobile), and is typically assumed as a door of the vehicle. The thin plate 4 is, however, not limited to the door of the vehicle. FIG. 1 illustrates a cross-sectional surface of the thin plate 4 that is a surface extending two-dimensionally and having a finite size. FIG. 1 is a conceptual diagram of the thin plate 4. The thin plate 4 is not always required to be a flat surface. Scales in a thickness direction (in the short side direction of the cross-sectional surface of the thin plate 4 in FIG. 1) and in a lateral direction (the long side direction of the cross-sectional surface of the thin plate 4 in FIG. 1) differ from each other. In the example illustrated in FIG. 1, the surface on the upper side of the thin plate 4 in the thickness direction is defined as a "front surface" while the surface on the lower side of the thin plate 4 in the thickness direction is defined as a "rear surface". The "front surface" indicates the surface exposed externally, that is, outside the thin plate 4, while the "rear surface" indicates the surface not exposed externally.

As illustrated in FIG. 1, in the first embodiment, the ultrasonic transmitter 1 is provided on the rear surface of the thin plate 4 (provided without penetrating the thin plate 4). The ultrasonic transmitter 1 transmits the pulse-shaped ultrasonic waves to the thin plate 4 to excite the thin plate 4. When the thin plate 4 is sufficiently thin, ultrasonic waves propagating the excited thin plate 4 are Lamb waves (flexural waves) having a vibration direction perpendicular to the thin plate 4. Part of the ultrasonic waves (Lamb waves) propagating the thin plate 4 excited by the pulse-shaped ultrasonic waves is radiated into the air as normal ultrasonic waves 6. The ultrasonic waves 6 (the ultrasonic waves radiated into the air near the front surface of the thin plate 4) do not have high directivity that the ultrasonic waves directly transmitted from the ultrasonic transmitter 1 have. The ultrasonic waves 6 are radiated such that the ultrasonic waves 6 cover the entire surface of the front surface of the thin plate 4 (the ultrasonic waves 6 have low directivity). When an object (obstacle) 7 is present near the front surface of the thin plate 4, the ultrasonic waves 6 radiated into the air are reflected by the object 7 and returned to the thin plate 4 again.

In the following description, among the ultrasonic waves (Lamb waves) propagating in the thin plate 4 excited by the pulse-shaped ultrasonic waves, the ultrasonic waves propagating only in the thin plate 4 are described as "direct waves 5", while the ultrasonic waves radiating outward and then reflected by the object 7 are described as "reflected waves 8". The reflected waves 8 having reached the thin plate 4 excite the thin plate 4 and spread entirely in the thin plate 4 as ultrasonic waves 9 (Lamb waves) propagating in the thin plate 4. In the following description, the ultrasonic waves 9 (Lamb waves) are described as "reflected waves 9". The "reflected waves", which are part of the ultrasonic waves propagating in the thin plate 4 excited by the pulse-shaped ultrasonic waves and which radiate outward, are reflected by the object 7, and then return to the thin plate 4, may be the reflected waves 8 reflected by the object 7 and returning to the thin plate 4 or the reflected waves 9 propagating in the thin plate 4 excited by the reflected waves 8.

The ultrasonic receiver 2 receives the direct waves 5 and the reflected waves among the ultrasonic waves propagating in the thin plate 4 excited by the pulse-shaped ultrasonic waves, the direct waves 5 propagating only in the thin plate 4 and the reflected waves radiating outward, then reflected by the object 7, and returning to the thin plate 4. In the embodiment, the ultrasonic receiver 2 receives the reflected waves 9. The ultrasonic receiver 2 is not limited to receiving the reflected waves 9. The ultrasonic receiver 2 can also directly receive the reflected waves 8, which is described later. In the same manner as the ultrasonic transmitter 1, the ultrasonic receiver 2 in the embodiment is provided on the rear surface of the thin plate 4.

The detector 3 detects the object 7 present near the thin plate 4 on the basis of a difference (time difference) between a time at which the ultrasonic receiver 2 receives the direct waves 5 and a time at which the ultrasonic receiver 2 receives the reflected waves 9. More specifically, the detector 3 can detect a distance between the thin plate 4 and the object 7 present near the thin plate 4 on the basis of the time difference. This is included in the concept that "the detector 3 detects the object 7 present near the thin plate 4". In this example, the ultrasonic receiver 2 and the detector 3 are integrated. The ultrasonic receiver 2 and the detector 3 are not limited to being integrated. For example, the detector 3 may be provided independently (individually).

Figure 2:
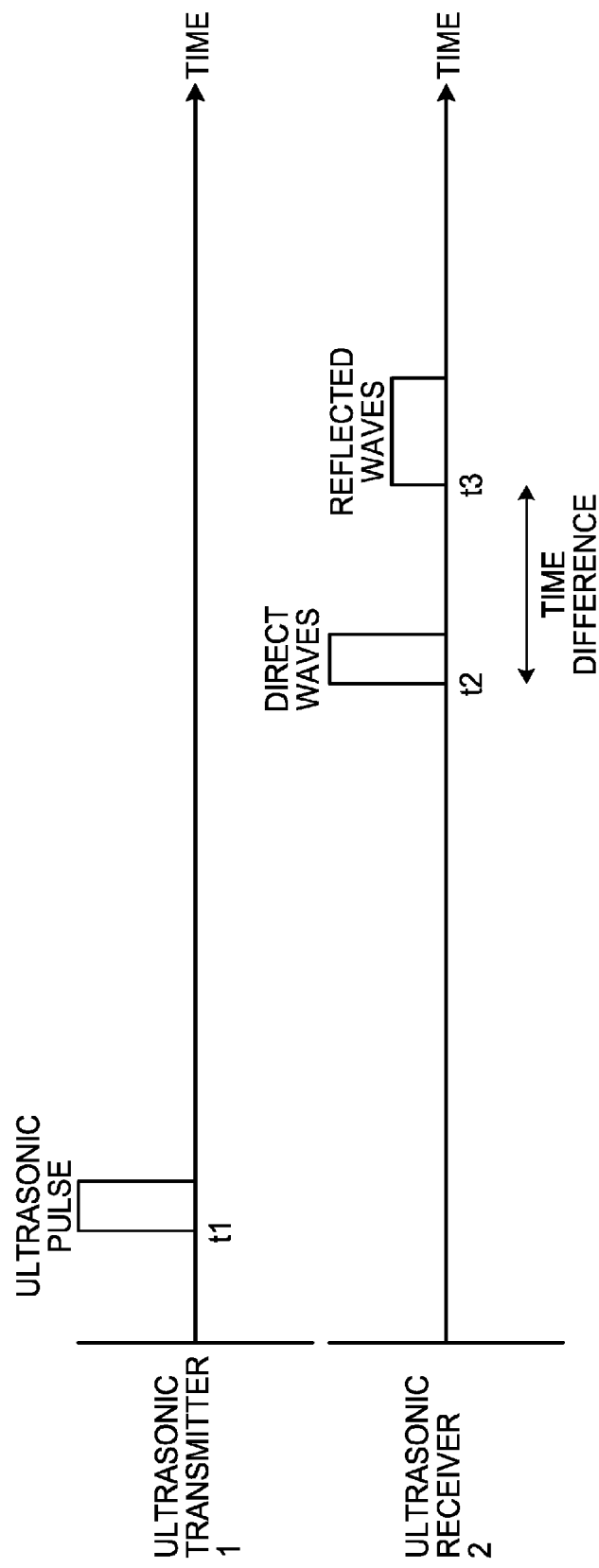
FIG. 2 is a diagram illustrating timings in transmission and receiving of ultrasonic waves in the first embodiment.

FIG. 2 is a diagram illustrating a timing t1 at which the ultrasonic transmitter 1 transmits the pulse-shaped ultrasonic waves, a timing t2 at which the ultrasonic receiver 2 receives the direct waves 5, and a timing t3 at which the ultrasonic receiver 2 receives the reflected waves 9. A transmission path distance of the reflected waves 9 is longer than a transmission path distance of the direct waves 5. The ultrasonic receiver 2, thus, receives the direct waves 5 and then receives the reflected waves 9. A time difference between the timing t2 and the timing t3 is equivalent to a time period from when the ultrasonic waves 6 are radiated into the air near the front surface of the thin plate 4 to when the ultrasonic waves 6 are returned to the thin plate 4 after being reflected by the object 7. A round-trip distance from the thin plate 4 to the object 7 can be calculated by multiplying the time difference by a sonic speed of the ultrasonic waves in the air, that is, 340 m/s. The distance from the thin plate 4 to the object 7, thus, can be detected.

Signal intensity of the reflected waves 9 is smaller than signal intensity of the direct waves 5. This makes it difficult to separate the reflected waves 9 from the direct waves 5 to detect the reflected waves 9 when the direct waves 5 and reflected waves 9 overlap with each other. In the example illustrated in FIG. 1, when the ultrasonic transmitter 1, the object 7, and the ultrasonic receiver 2 are disposed on an identical plane (the cross-sectional surface), the time difference between the direct waves 5 and the reflected waves 9 is the shortest. The time difference is a round-trip time period of the ultrasonic waves traveling the round-trip distance from the thin plate 4 to the object 7. A minimum detection distance is, thus, determined by a pulse width of the ultrasonic waves. For example, when a close distance of an about 10 cm needs to be detected, the pulse width of the ultrasonic waves needs to be equal to or smaller than about 500 microseconds.

The Lamb waves (the direct waves 5 or the reflected waves 9) propagating in the thin plate 4 that is excited by the pulse-shaped ultrasonic waves transmitted from the ultrasonic transmitter 1 or excited by the reflected waves 8 reflected by the object 7 are reflected at the end portion of the thin plate 4. As a result, what is called a reverberation occurs, thereby making it difficult to detect a correct signal (ultrasonic signal). As illustrated in FIG. 1, the ultrasonic transmitter 1 and the ultrasonic receiver 2 are disposed at a peripheral portion (end portion) of the thin plate 4, in the embodiment, thereby making it possible to minimize influence of the reverberation.

As described above, in the embodiment, the object 7 present near the thin plate 4 is detected. Specifically, the pulse-shaped ultrasonic waves are transmitted to the thin plate 4 to excite the thin plate 4. The object 7 is detected on the basis of a difference between a time at which the direct waves 5 are received and a time at which the reflected waves 9 are received. The direct waves 5 propagate only in the thin plate 4 in the ultrasonic waves propagating in the excited thin plate 4. The reflected waves 9 are part of the ultrasonic waves propagating in the excited thin plate 4, the reflected waves 9 radiating outward, then, reflected by the object 7, and then returning to the thin plate 4. The ultrasonic waves radiating outward from the thin plate 4 excited by the pulse-shaped ultrasonic waves have low directivity and, thus, are radiated such that the ultrasonic waves cover the entire surface of the front surface of the thin plate 4. It is, thus, unnecessary to two-dimensionally arrange a plurality of ultrasonic sensors each including a set of the ultrasonic transmitter 1 and the ultrasonic receiver 2 on the entire surface of the front surface of the thin plate 4 in a conventional manner. This makes it possible to reduce the number of ultrasonic sensors necessary for object detection, thereby making it possible to prevent deterioration of an exterior design of a portion where the ultrasonic sensor is disposed while the manufacturing cost is reduced.

In the embodiment, the ultrasonic transmitter 1 and the ultrasonic receiver 2 are disposed on the rear surface of the thin plate 4. The ultrasonic transmitter 1 and the ultrasonic receiver 2 are, thus, not visually recognized when the front surface of the thin plate 4 is observed. This structure (the ultrasonic transmitter 1 and the ultrasonic receiver 2 are disposed on the rear surface of the thin plate 4) is highly effective from a viewpoint of prevention of deterioration of an exterior design of a portion where the ultrasonic sensor is disposed. In conventional techniques, there is a case where the ultrasonic wave sensor is disposed after drilling the thin plate 4 so as to radiate the ultrasonic wave having high directivity outward (so as to expose the ultrasonic sensor). The embodiment does not need to drill the thin plate 4 to dispose the ultrasonic sensor. The embodiment can prevent deterioration of the exterior design from this viewpoint, too.

When the ultrasonic sensor aims to detect the object near a door of a vehicle (i.e., the thin plate 4 is the door of the vehicle), an exterior design of the door particularly deteriorates in a case where the ultrasonic sensor is exposed from the front surface of the door of the vehicle. The ultrasonic sensor in the embodiment is, thus, highly effective when the ultrasonic sensor aims to detect the object near a door of a vehicle (i.e., the thin plate 4 is the door of the vehicle).

First Modification of First Embodiment

Figure 3:
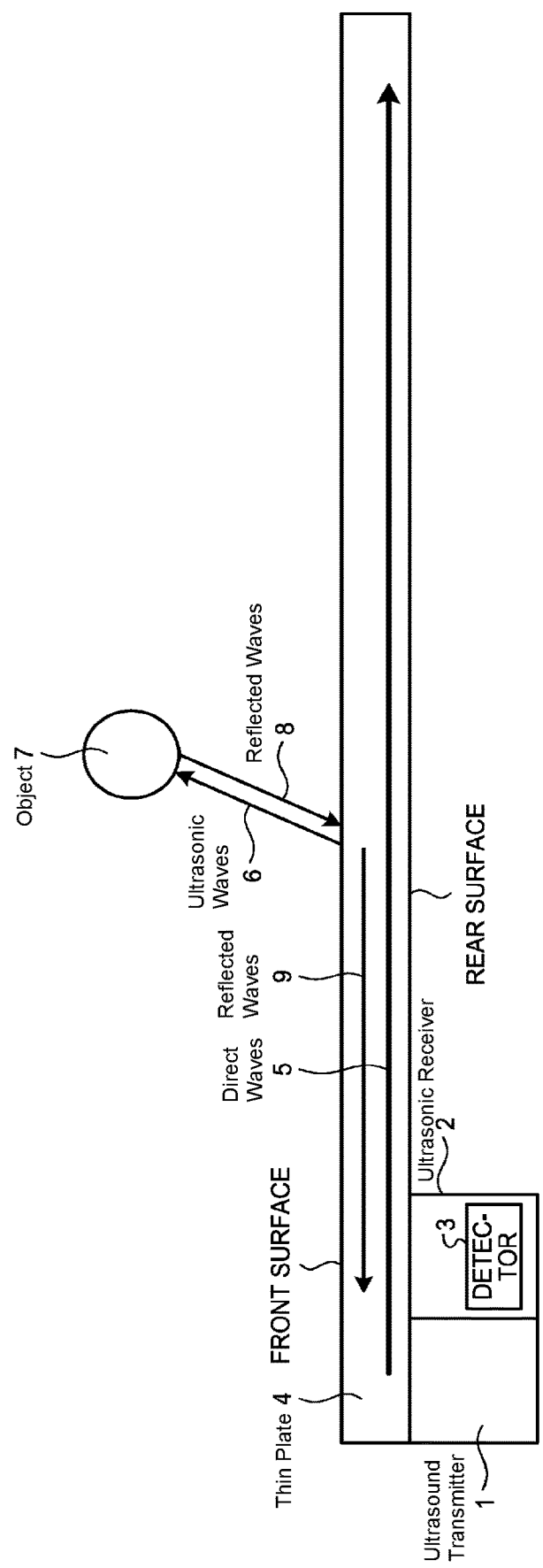
FIG. 3 is a diagram illustrating an exemplary disposition of the ultrasonic sensor in a first modification of the first embodiment.
Figure 4:
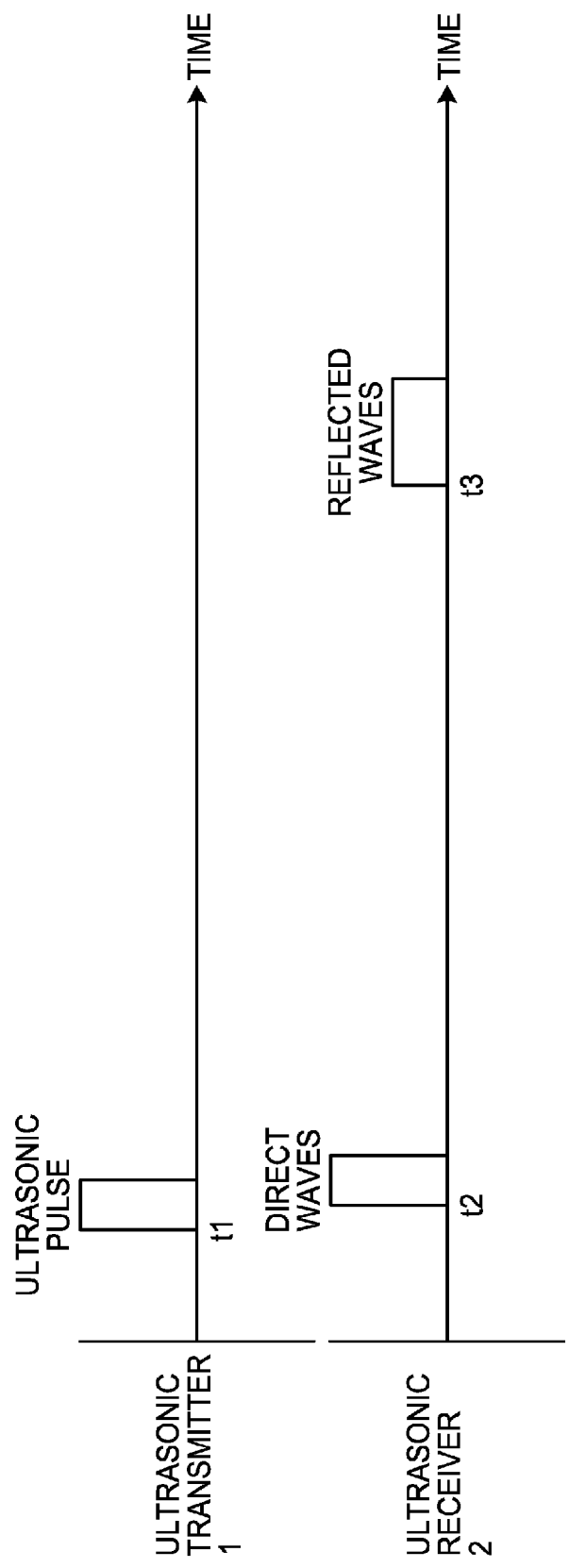
FIG. 4 is a diagram illustrating timings in transmission and receiving of the ultrasonic waves in the first modification of the first embodiment.

As illustrated in FIG. 3, the ultrasonic transmitter 1 and the ultrasonic receiver 2 may be arranged such that they are adjacent to and in contact with each other, for example. For another example, the ultrasonic transmitter 1 and the ultrasonic receiver 2 may be mounted on an identical housing in a consolidated manner. FIG. 4 is a diagram illustrating the timing t1 at which the ultrasonic transmitter 1 transmits the pulse-shaped ultrasonic waves, the timing t2 at which the ultrasonic receiver 2 receives the direct waves 5, and the timing t3 at which the ultrasonic receiver 2 receives the reflected waves 9 in the structure illustrated in FIG. 3.

Second Modification of First Embodiment

Figure 5:
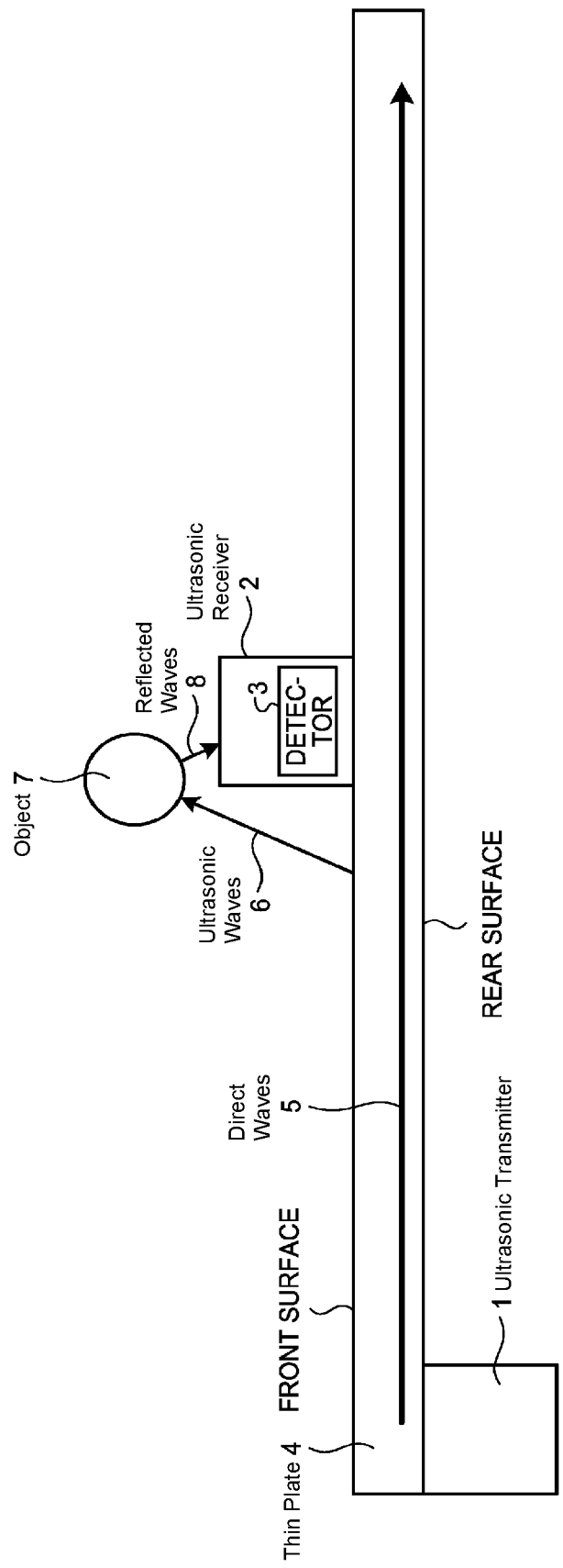
FIG. 5 is a diagram illustrating an exemplary disposition of the ultrasonic sensor in a second modification of the first embodiment.

The ultrasonic receiver 2 may be disposed on the front surface of the thin plate 4, for example. In this case, the position of the ultrasonic receiver 2 on the front surface of the thin plate 4 can be set to any desired position. For example, as illustrated in FIG. 5, the position of the ultrasonic receiver 2 is set (e.g., preliminarily set by simulation) such that the ultrasonic receiver 2 can directly receive the reflected waves 8 from the object 7, thereby making it possible for the ultrasonic receiver 2 to increase sensitivity in receiving the signal (ultrasonic signal). The position of the ultrasonic receiver 2 is set such that the ultrasonic receiver 2 directly receives the reflected waves 8 before the reflected waves 8 excite the thin plate 4, thereby making it possible to increase sensitivity in receiving the signal.

Third Modification of First Embodiment

Figure 6:
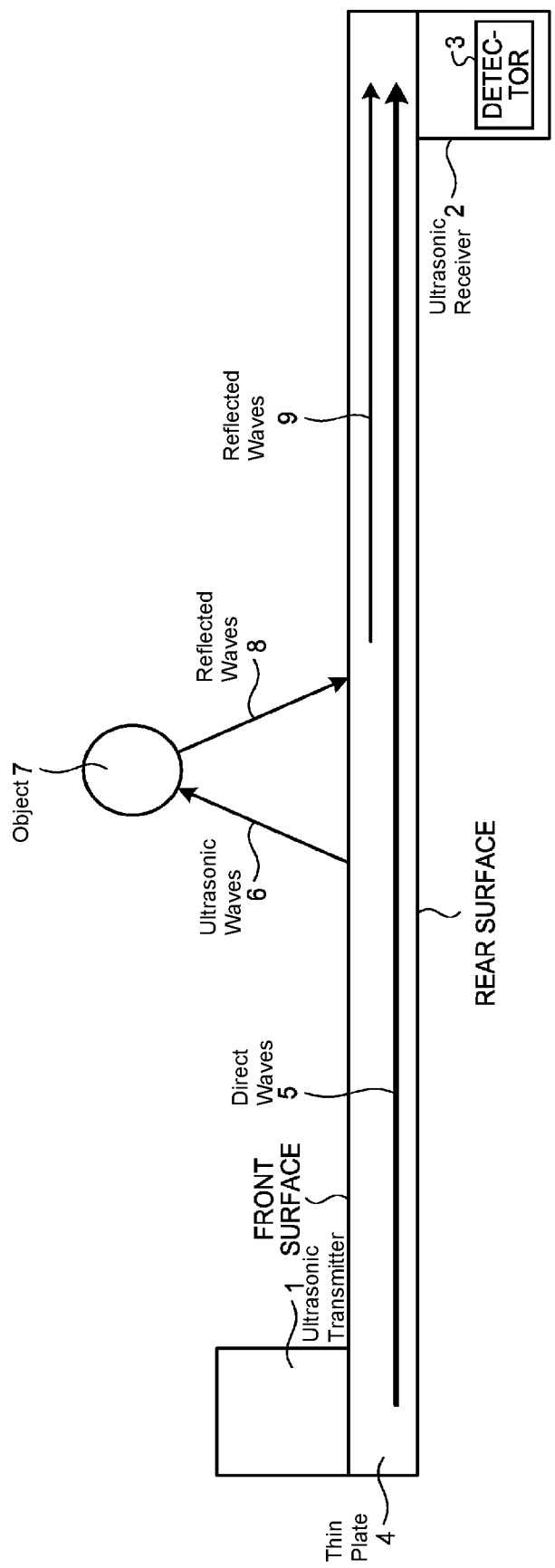
FIG. 6 is a diagram illustrating an exemplary disposition of the ultrasonic sensor in a third modification of the first embodiment.
Figure 7:
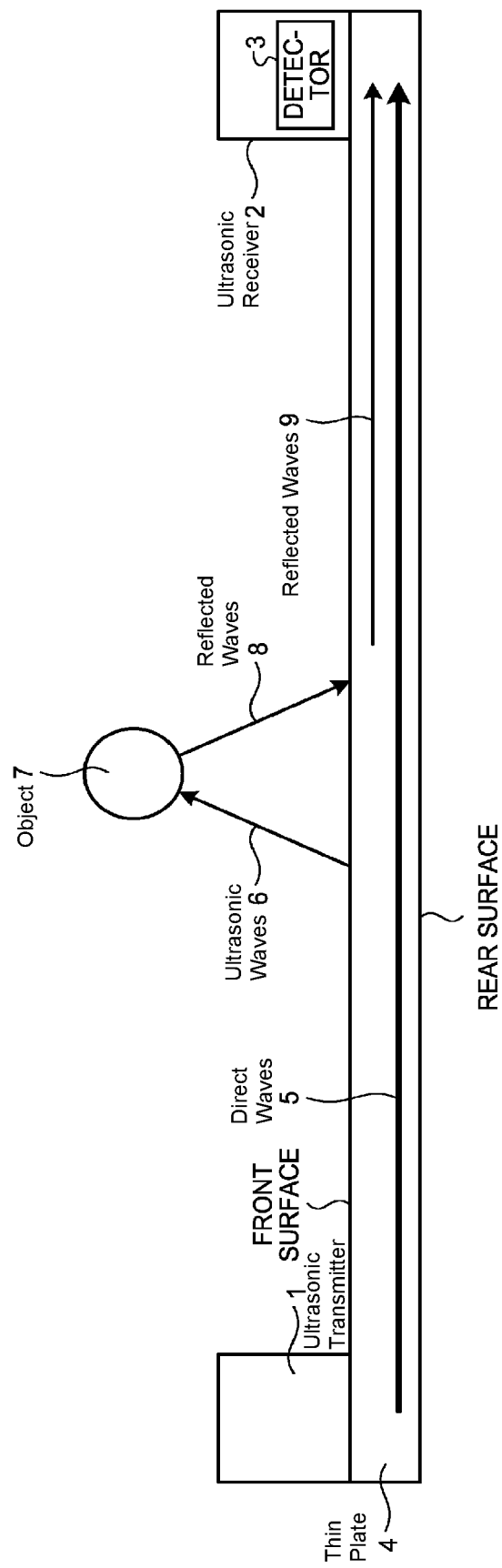
FIG. 7 is a diagram illustrating another exemplary disposition of the ultrasonic sensor in the third modification of the first embodiment.

The positions of the ultrasonic transmitter 1 and the ultrasonic receiver 2 disposed on the thin plate 4 can be changed to any desired positions. The positions are not limited to those described in the first embodiment and the first and the second modifications. For example, as illustrated in FIG. 6, the ultrasonic transmitter 1 may be disposed on the front surface of the thin plate 4 while the ultrasonic receiver 2 may be disposed on the rear surface of the thin plate 4. For another example, as illustrated in FIG. 7, the ultrasonic transmitter 1 and the ultrasonic receiver 2 may be disposed on the front surface of the thin plate 4.

Second Embodiment

The following describes a second embodiment. In the second embodiment, the object 7 is detected using two ultrasonic waves having different frequencies. The following describes the details thereof. The description in common with that in the first embodiment is omitted as appropriate. In the second embodiment, the ultrasonic transmitter 1 and the ultrasonic receiver 2 are arranged on the thin plate 4 in the same manner as the first embodiment (the same as that illustrated in FIG. 1). The arrangement is obviously not limited to that illustrated in FIG. 1.

The ultrasonic transmitter 1 transmits two pulse-shaped ultrasonic waves having different frequencies. Specifically, the ultrasonic transmitter 1 transmits pulse-shaped ultrasonic wave having a first frequency and pulse-shaped ultrasonic waves having a second frequency.

The ultrasonic receiver 2 receives the direct waves 5 and the reflected waves 9 that correspond to the pulse-shaped ultrasonic waves having the first frequency, and the direct waves 5 and the reflected waves 9 that correspond to the pulse-shaped ultrasonic waves having the second frequency. The detector 3 detects the object 7 on the basis of a detection result of the object 7 using the pulse-shaped ultrasonic waves having the first frequency and a detection result of the object 7 using the pulse-shaped ultrasonic waves having the second frequency. More specifically, the detector 3 detects the object 7 on the basis of the following two detection results of the object 7. One is the detection result of the object 7 on the basis of a difference between a receiving time of the direct waves 5 corresponding to the pulse-shaped ultrasonic waves having the first frequency and a receiving time of the reflected waves 9 corresponding to the pulse-shaped ultrasonic waves having the first frequency (corresponds to "the detection result using the pulse-shaped ultrasonic waves having the first frequency"). The other is the detection result of the object 7 on the basis of a difference between a receiving time of the direct waves 5 corresponding to the pulse-shaped ultrasonic waves having the second frequency and a receiving time of the reflected waves 9 corresponding to the pulse-shaped ultrasonic waves having the second frequency (corresponds to "the detection result using the pulse-shaped ultrasonic waves having the second frequency").

Figure 8:
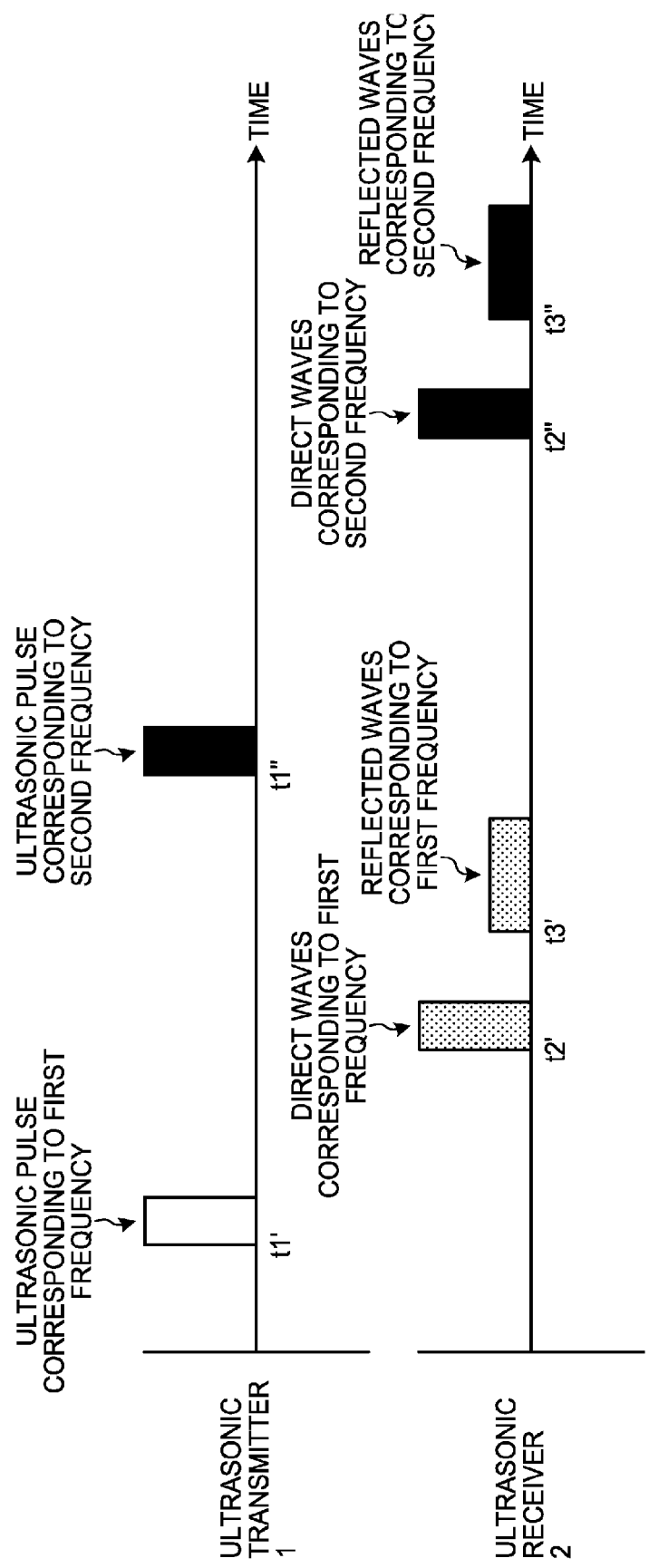
FIG. 8 is a diagram illustrating timings in transmission and receiving of ultrasonic waves in a second embodiment.

FIG. 8 is a diagram illustrating timings when the ultrasonic transmitter 1 transmits the pulse-shaped ultrasonic waves having the first frequency and the pulse-shaped ultrasonic waves having the second frequency at a certain time interval. The timings are: a timing t1' at which the ultrasonic transmitter 1 transmits the pulse-shaped ultrasonic waves having the first frequency, a timing t2' at which the ultrasonic receiver 2 receives the direct waves 5 corresponding to the pulse-shaped ultrasonic waves having the first frequency, a timing t3' at which the ultrasonic receiver 2 receives the reflected waves 9 corresponding to the pulse-shaped ultrasonic waves having the first frequency, a timing t1" at which the ultrasonic transmitter 1 transmits the pulse-shaped ultrasonic waves having the second frequency, a timing t2" at which the ultrasonic receiver 2 receives the direct waves 5 corresponding to the pulse-shaped ultrasonic waves having the second frequency, and a timing t3" at which the ultrasonic receiver 2 receives the reflected waves 9 corresponding to the pulse-shaped ultrasonic waves having the second frequency.

A time difference between the timing t2' and the timing t3' is equivalent to a time period from when the ultrasonic waves 6 are radiated in the air near the front surface of the thin plate 4 to when the ultrasonic waves 6 are returned to the thin plate 4 after being reflected by the object 7, for example. A round-trip distance from the thin plate 4 to the object 7 can be calculated by multiplying the time difference by a sonic speed of the ultrasonic waves in the air, that is, 340 m/s, which is not changed by frequency. Likewise, a round-trip distance from the thin plate 4 to the object 7 can also be calculated from a time difference between the timing t2" and the timing t3".

Depending on a frequency of the ultrasonic waves or a distance from the thin plate 4 to the object 7, the distance from the thin plate 4 to the object 7 is smaller than the distance of a single wavelength of the ultrasonic waves. As a result, the distance cannot be detected. To cope with such a circumstance, in the embodiment, the distance detection (detection of the distance between the thin plate 4 and the object 7) is performed using each of the two ultrasonic waves having different frequencies, thereby making it possible also to choose the detection result indicating a value in a normal range as the final detection result. The detector 3 can choose either the detection result (detection result of the distance to the object 7) using the pulse-shaped ultrasonic waves having the first frequency or the detection result using the pulse-shaped ultrasonic waves having the second frequency, that is, choose one indicating a value in a normal range. This can prevent occurrence of a distance detection error. Besides the way described above, the detector 3 may combine the detection result using the pulse-shaped ultrasonic waves having the first frequency and the detection result using the pulse-shaped ultrasonic waves having the second frequency by averaging or weighting them and adopt the combination result as the final detection result, for example. As a result, distance detection accuracy can also be increased.

Figure 9:
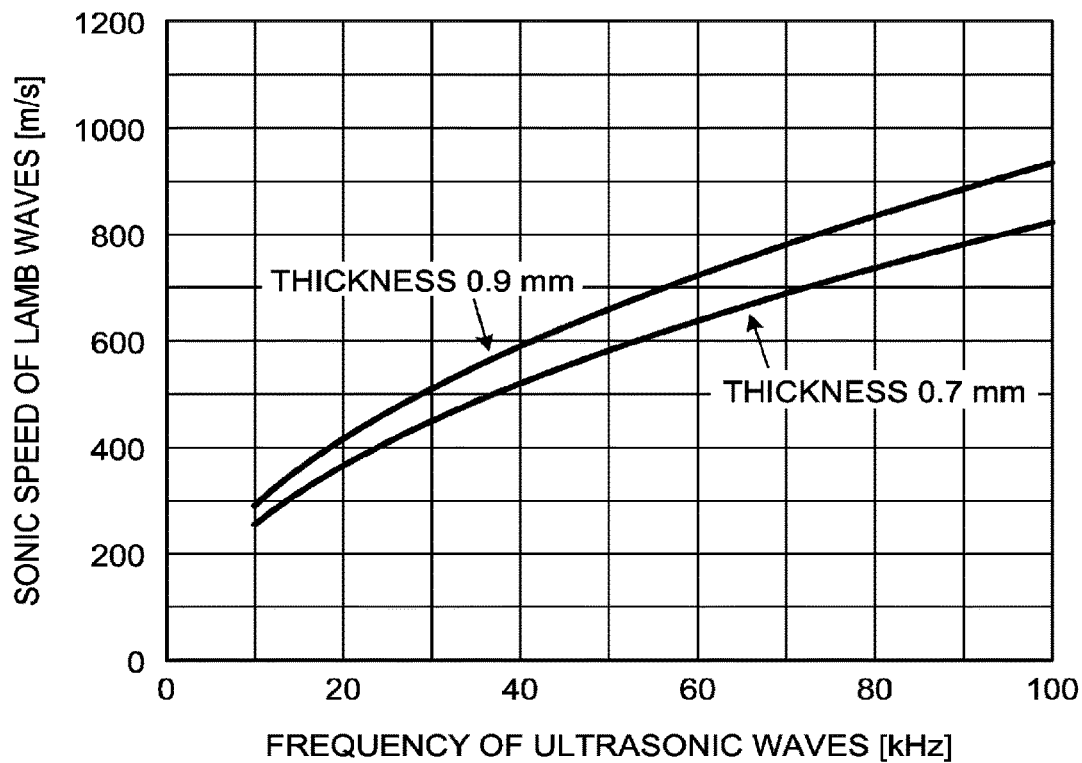
FIG. 9 is a diagram illustrating a relation between a frequency of the ultrasonic waves and a sonic speed of Lamb waves for each of two thin plates having different thicknesses.

The sonic speed of the Lamb waves in the thin plate 4 differs in not only physical property values of a material of the thin plate but also the thickness of the thin plate 4 and a frequency of the ultrasonic waves. FIG. 9 illustrates a relation between the frequency of the ultrasonic waves and the sonic speed of the Lamb waves for each of the thin plates 4 that are made of a steel and have a thickness of 0.7 mm and 0.9 mm. The sonic speed increases in proportion to the frequency. For example, the sonic speed in the thin plate 4 made of a steel with a thickness of 0.7 mm is 520 m/s at 40 kHz and 640 m/s at 60 kHz. The sonic speed of the ultrasonic waves in the air is 340 m/s, which is not changed by frequency.

An arrival time indicating the time period from when the ultrasonic transmitter 1 transmits the pulse-shaped ultrasonic waves to when the ultrasonic receiver 2 receives the reflected waves 9 (the length of time from t1' to t3' or from t1" to t3") differs in frequency. This is because a propagation time differs in the thin plate 4 for each of the ultrasonic waves having different sonic speeds in the thin plate 4. A propagation distance in the thin plate 4 can be calculated using a difference in arrival time and a difference in sonic speed. When the propagation distance in the thin plate 4 is known, a time period of the Lamb waves propagating in only the thin plate 4 (corresponding to a time period of t2' minus t1', that is, the length of time until the ultrasonic receiver 2 receives the direct waves 5) can be obtained by dividing the propagation distance by the sonic speed in the thin plate 4 corresponding to the first frequency. The time difference corresponding to t3' minus t2' in FIG. 8 can be obtained by subtracting the obtained propagation time from a time period of t3' minus t1', that is, the length of time until the ultrasonic receiver 2 receives the reflected waves 9). The round-trip distance from the thin plate 4 to the object 7 can be calculated by multiplying the time difference corresponding to t3' minus t2' in FIG. 8 by the sonic speed in the air, which is always 340 m/s unchanged by frequency, thereby making it possible to calculate the distance from the thin plate 4 to the object 7. As a result, the detection result corresponding to the first frequency can be obtained. The detection result corresponding to the second frequency can also be obtained in the same manner as described above. The detection result corresponding to each of the two frequencies can be obtained when the relation between the frequency of the ultrasonic waves and the sonic speed of Lamb waves is known and the arrival time, which is a time period from when the ultrasonic transmitter 1 transmits the pulse-shaped ultrasonic waves and to when the ultrasonic receiver 2 receives the reflected waves 9, is known for each frequency.

Third Embodiment

The following describes a third embodiment. In the third embodiment, three or more ultrasonic receivers 2 are disposed on the thin plate 4 and the detector 3 detects the object 7 on the basis of a difference between a time at which the ultrasonic receiver 2 receives the direct waves and a time at which the ultrasonic receiver 2 receives the reflected waves for each of the ultrasonic receivers 2. The following describes the details thereof. The description in common with that in the first embodiment is omitted as appropriate.

Figure 10:
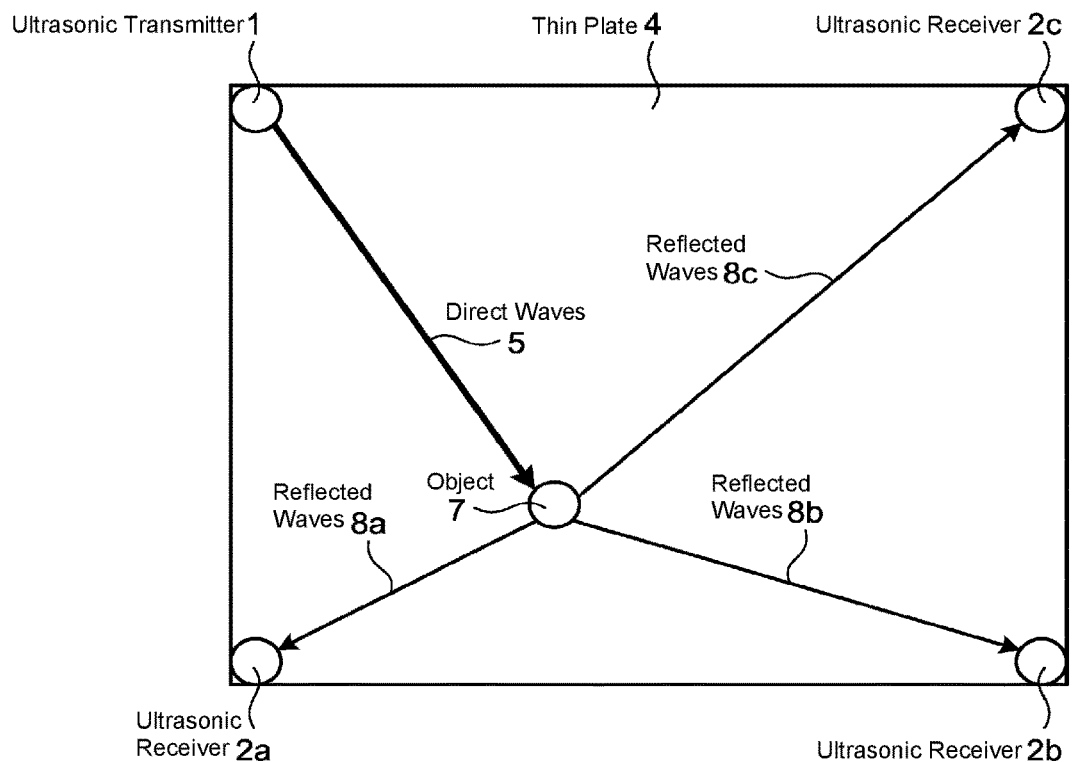
FIG. 10 is a diagram illustrating an exemplary disposition of ultrasonic sensors in a third embodiment.

FIG. 10 is a plan view illustrating an exemplary arrangement of the ultrasonic transmitter 1 and three ultrasonic receivers 2a to 2c. In the same manner as the first embodiment, the ultrasonic transmitter 1 and the three ultrasonic receivers 2a to 2c are arranged on the rear surface of the thin plate 4. In the following description, the ultrasonic receivers 2a to 2c are simply described as the "ultrasonic receiver 2" when they do not need to be described individually.

Figure 11:
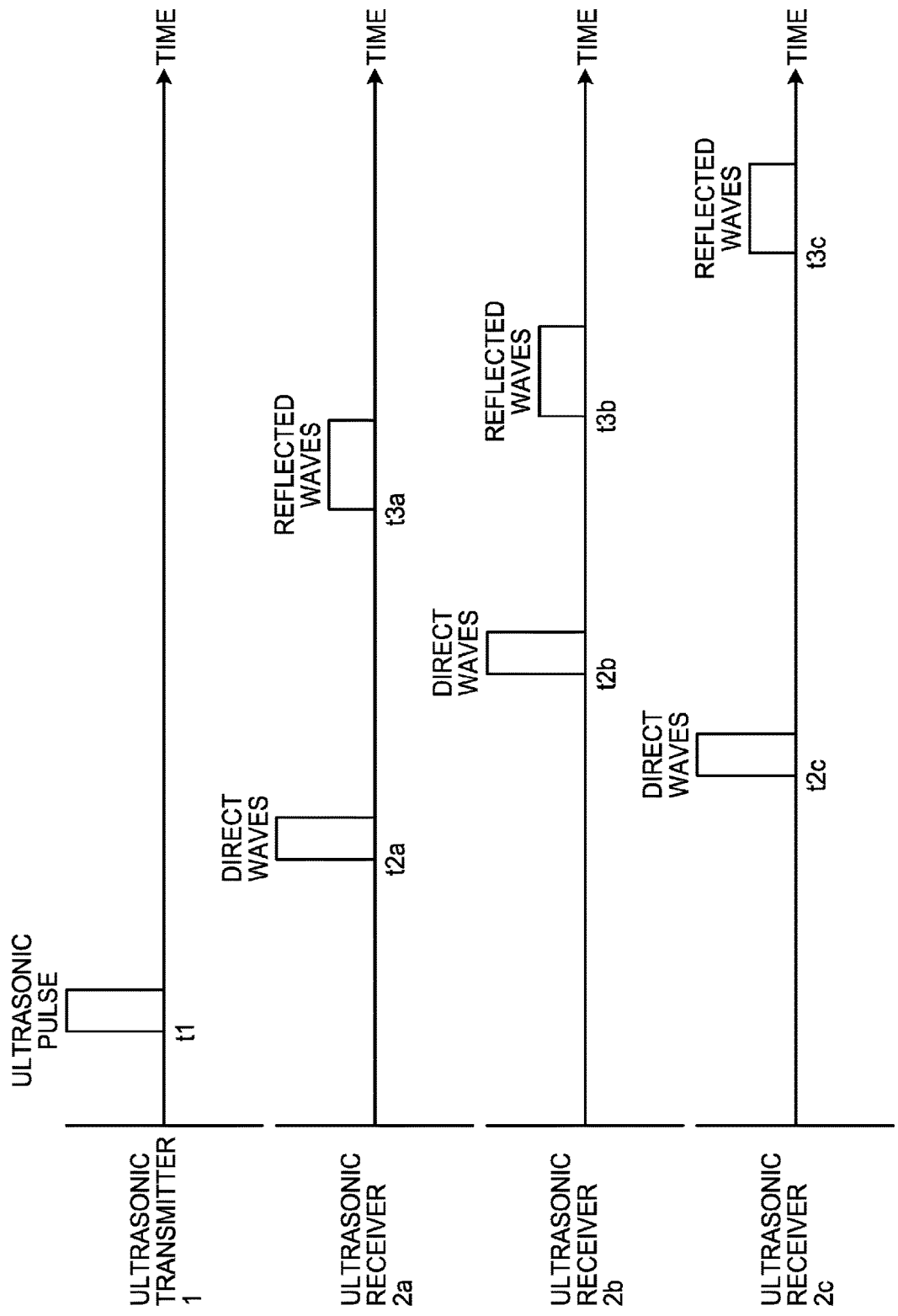
FIG. 11 is a diagram illustrating timings in transmission and receiving of the ultrasonic waves in the third embodiment.

FIG. 11 is a diagram illustrating the timing t1 at which the ultrasonic transmitter 1 transmits the pulse-shaped ultrasonic waves, timings t2a to t2c at which the respective ultrasonic receivers 2a to 2c receive the direct waves 5, and timings t3a to t3c at which the respective ultrasonic receivers 2a to 2c receive the reflected waves 9. In the following description, the timings t2a to t2c are simply described as the "timing t2" when they do not need to be described individually while the timings t3a to t3c are simply described as the "timing t3" when they do not need to be described individually in some cases. For each of the ultrasonic receivers 2a to 2c, the distance from the thin plate 4 to the object 7 can be detected on the basis of the time difference between the timing t2 and timing t3. This detection method is the same as that in the first embodiment.

For example, when the object 7 present near the front surface of the thin plate 4 is the object that does not extend widely such as a pole, the distance may be failed to be detected depending on the place of the disposition of the ultrasonic receiver 2. To cope with such a circumstance, in the embodiment, three ultrasonic receivers 2a to 2c are disposed on the thin plate 4, and the detector 3 detects the object 7 on the basis of the time difference between the timing t2 and the timing t3 for each ultrasonic receiver 2. More specifically, the detector 3 detects the distance from the thin plate 4 to the object 7, for each of the ultrasonic receivers 2a to 2c, on the basis of a difference between the timing t2 at which the corresponding ultrasonic receiver 2 receives the direct waves 5 and the timing t3 at which the corresponding ultrasonic receiver 2 receives the reflected waves 9. As a result, the detection result is obtained for each of the ultrasonic receivers 2a to 2c. The detector 3 may also choose, as the final detection result, the detection result indicating a value in a normal range out of the detection results of the respective ultrasonic receivers 2a to 2c.

For another example, when the object 7 present near the front surface of the thin plate 4 is an object that extends widely such as a wall and the detection result is obtained for each of the ultrasonic receivers 2a to 2c, the detector 3 can estimate a three-dimensional position of the object 7 on the basis of the detection results of the respective ultrasonic receivers 2a to 2c (the detection result of the object 7, for each of the ultrasonic receivers 2a to 2c, on the basis of a difference between the time at which the corresponding ultrasonic receiver 2 receives the direct waves 5 and the time at which the corresponding ultrasonic receiver 2 receives the reflected waves 9) and a positional relation between the ultrasonic transmitter 1 and each of the ultrasonic receivers 2a to 2c. For the estimation method of the three-dimensional position, various known techniques relating to estimation technique of three-dimensional position can be used.

Fourth Embodiment

Figure 12:
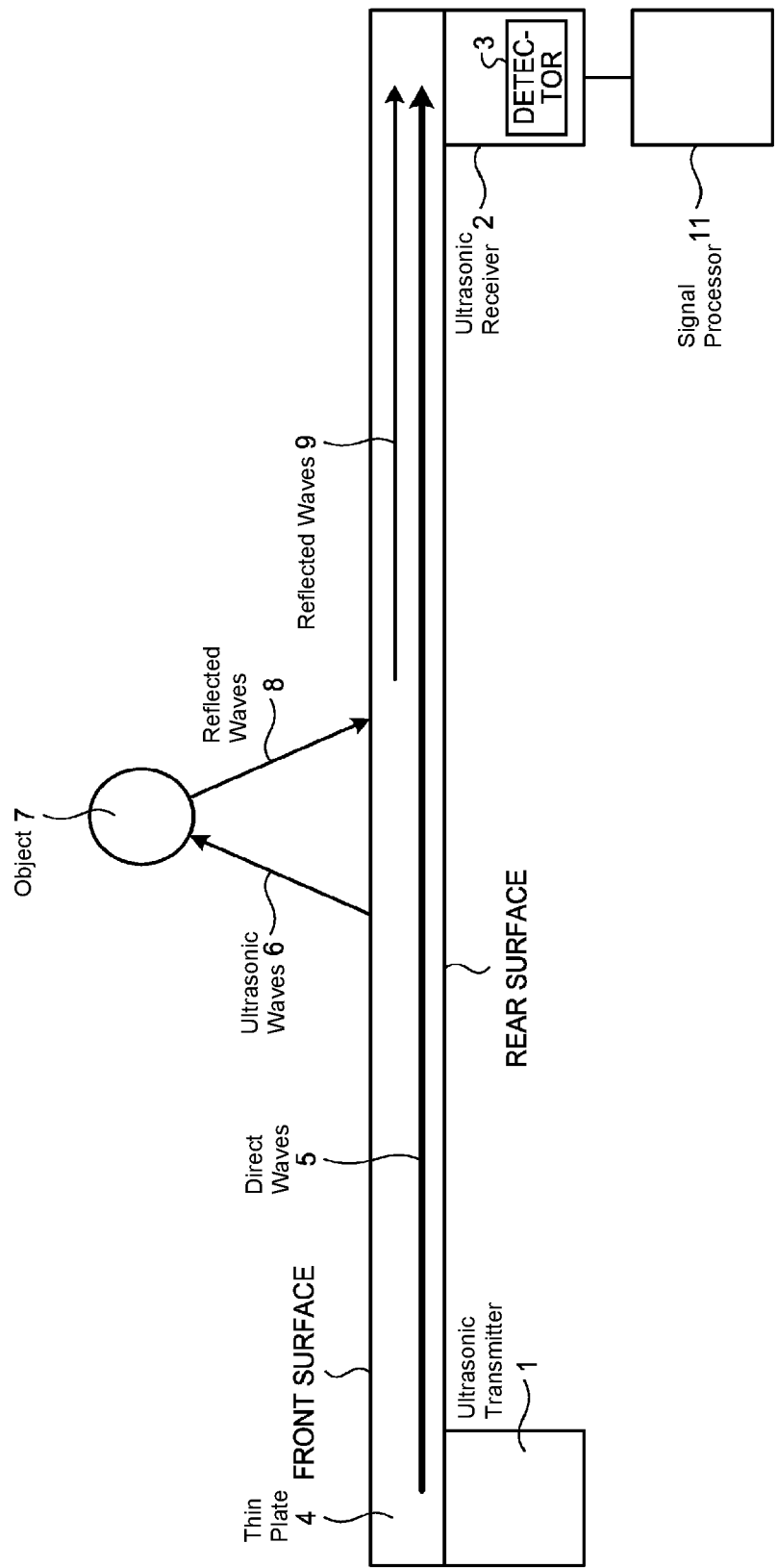
FIG. 12 is a schematic structural view of an ultrasonic sensor in a fourth embodiment.

The following describes a fourth embodiment. As illustrated in FIG. 12, the ultrasonic sensor in the fourth embodiment further includes a signal processor 11. The signal processor 11 has a function that removes a reference signal indicating a signal (ultrasonic signal) caused by factors other than the object 7 from the signal (ultrasonic signal) received by the ultrasonic receiver 2 and inputs the signal after the removal to the detector 3. In this example, the signal processor 11 is provided separate from the ultrasonic receiver 2. The signal processor 11 is not limited to being provided separate from the ultrasonic receiver 2. The signal processor 11 may be provided integrally with the ultrasonic receiver 2.

The signal processor 11 preliminarily acquires, as the reference signal, a signal received by the ultrasonic receiver 2 when the ultrasonic transmitter 1 transmits the pulse-shaped ultrasonic waves to the thin plate 4 to excite the thin plate 4 in a state where the object 7 is absent near the front surface of the thin plate 4. For example, when the ultrasonic sensor aims to detect an object near a door of a vehicle (the thin plate 4 is the door of the vehicle), the reference signal includes a signal caused by a fixed structure of the vehicle (a signal reflected by the fixed structure and returned to the ultrasonic sensor), for example. The reference signal includes a signal caused by vibration (residual vibration) remaining after the thin plate 4 is excited by the pulse-shaped ultrasonic waves transmitted by the ultrasonic transmitter 1, for example.

When the detector 3 performs detection on the object 7 (in a detection mode), the signal processor 11 removes the reference signal from the signal received by the ultrasonic receiver 2 and inputs the signal after the removal to the detector 3. The detector 3 detects the object 7 on the basis of the signal input by the signal processor 11. The detector 3 can detect the object 7 on the basis of a signal from which unwanted noises have been effectively removed, thereby making it possible to increase detection accuracy of the object 7.

Modification of Fourth Embodiment

Figure 13:
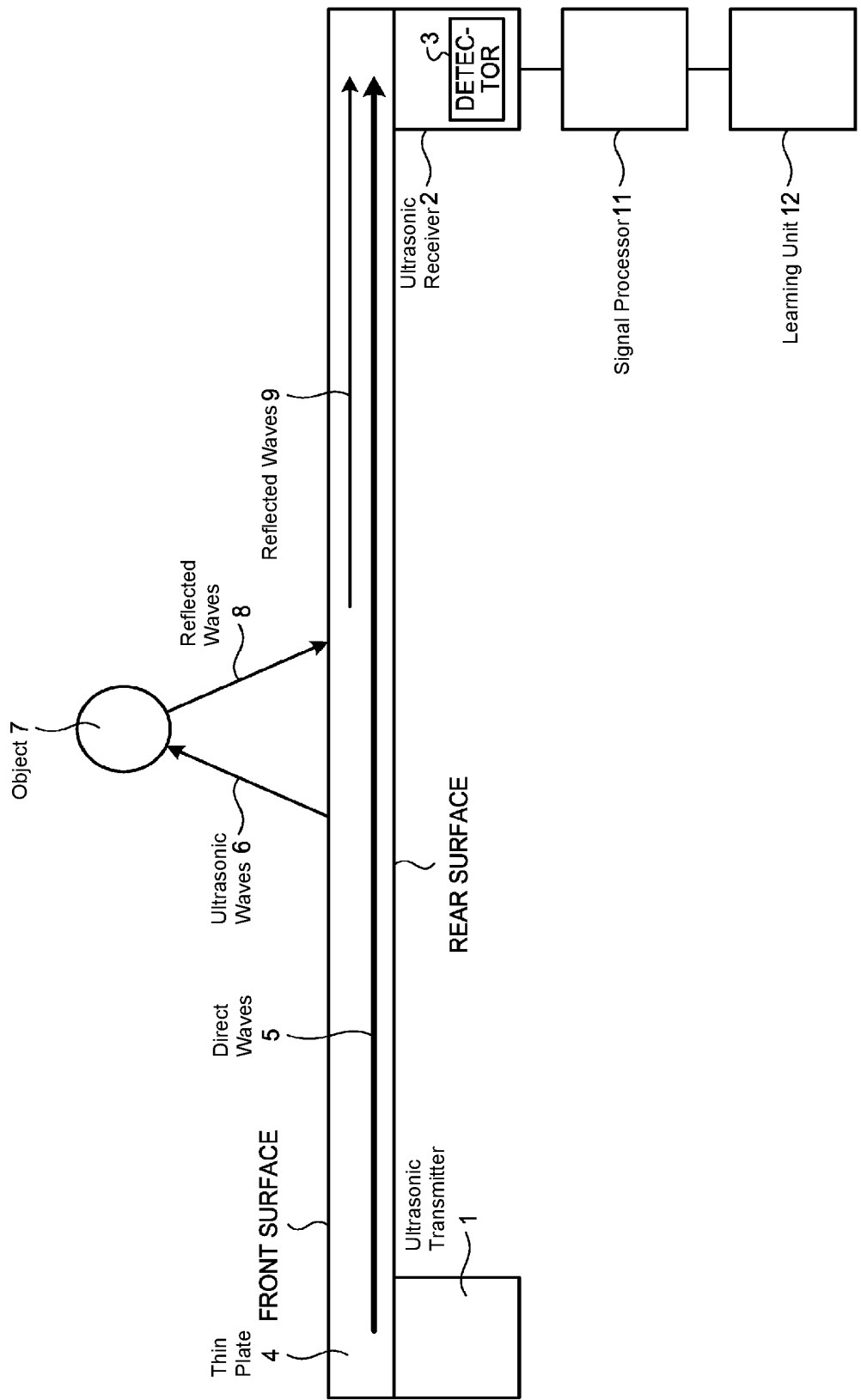
FIG. 13 is a schematic structural view of the ultrasonic sensor in a modification of the fourth embodiment.

The reference signal caused by factors other than the object 7 changes depending on environments such as a material of the thin plate 4, a temperature, and a humidity. For more effectively removing noises, the ultrasonic sensor may further include a learning unit 12 as illustrated in FIG. 13, for example. In this example, the learning unit 12 is provided separate from the signal processor 11 and the ultrasonic receiver 2. The learning unit 12 is not limited to being provided as this example. For example, the learning unit 12 may be provided integrally with at least one of the signal processor 11 and the ultrasonic receiver 2.

The learning unit 12 learns the reference signal for each of a plurality of kinds of environments. The environment in the embodiment includes at least one of a temperature, a humidity, and the material of the thin plate 4. A set of a temperature, a humidity, and a material is defined as a single "environment". The learning unit 12 collects and learns, for each of the multiple kinds of environments, a signal received by the ultrasonic receiver 2 when the thin plate 4 is excited in a state where the object 7 is absent near the front surface of the thin plate 4. This learning makes it possible to construct the learned reference signal for each of the multiple kinds of environments. The signal processor 11 removes the learned reference signal corresponding to a current environment from the signal received by the ultrasonic receiver 2. This makes it possible to more effectively remove noises.

Fifth Embodiment

Figure 14:
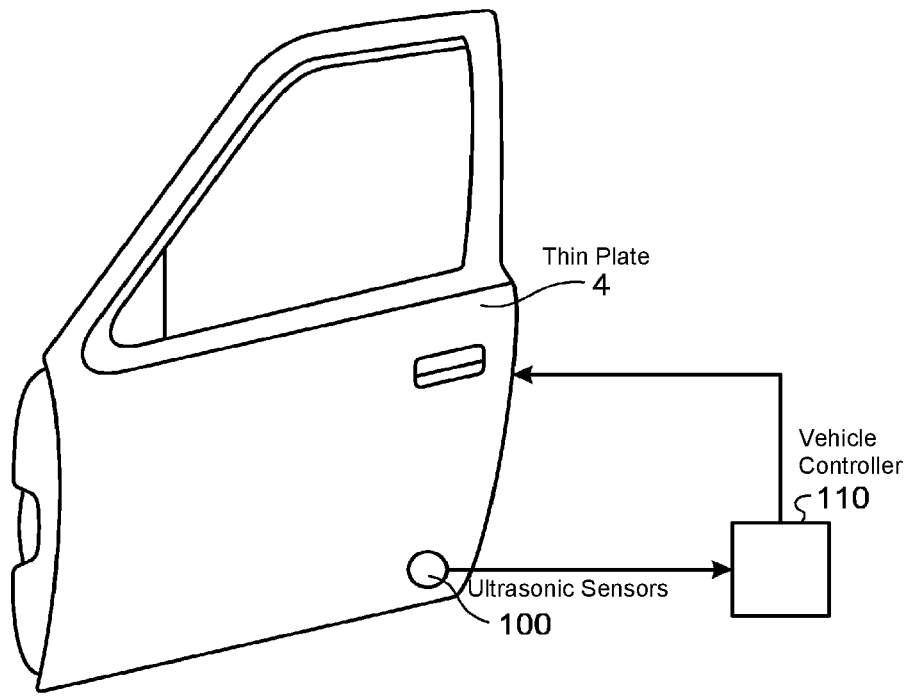
FIG. 14 is a schematic structural view of a vehicle control system in a fifth embodiment.

The following describes a fifth embodiment. The fifth embodiment is a vehicle control system using the ultrasonic sensors described in the respective embodiments. The vehicle control system is a control system mounted on a vehicle. FIG. 14 is a diagram illustrating an exemplary schematic structure of the vehicle control system in the embodiment. As illustrated in FIG. 14, the vehicle control system includes an ultrasonic sensor 100 and a vehicle controller 110. The ultrasonic sensor 100 and the vehicle controller 110 are coupled via an in-vehicle network such as a controller area network (CAN), for example. The ultrasonic sensor 100 and the vehicle controller 110 are not limited to being coupled in such a manner. They may be coupled via a wired network, for example. To the ultrasonic sensor 100, any of the ultrasonic sensors in the respective embodiments is applicable. The ultrasonic sensor 100 includes the ultrasonic transmitter 1, the ultrasonic receiver 2, and the detector 3.

The vehicle controller 110 is an engine control unit (ECU), for example. The vehicle controller 110 controls the vehicle using the detection result of the ultrasonic sensor 100. In this example, the vehicle controller 110 determines whether an obstacle (the object 7) is present in a distance of 10 cm from the door on the basis of the detection result of the ultrasonic sensor 100. When it is determined that the obstacle is present in a distance of 10 cm from the door, the vehicle controller 110 performs control to stop door open operation (control to prevent the door from being further opened) to avoid collision of the door with the obstacle.

The vehicle controller 110 is not limited to perform the control described above. For example, the ultrasonic sensors 100 are disposed on exterior surfaces, each of which serves as the thin plate 4, of left and right corners on the front side or the rear side of a vehicle, and the vehicle controller 110 may determine whether an obstacle (the object 7) is present in a distance of 10 cm from each corner (thin plate 4) on the basis of the detection result of the corresponding ultrasonic sensor 100. When it is determined that an obstacle is present in a distance of 10 cm from the corner, the vehicle controller 10 may control running of the vehicle such that the collision of the vehicle with the obstacle is avoided. The controlling manner can be changed in any desired manner as long as the vehicle controller 110 controls the vehicle using the detection result of the ultrasonic sensor 100.

The present invention is not limited to the embodiments described above. The constituent elements can be modified without departing from the scope of the invention in implementation. The multiple constituent elements disclosed in the embodiments are appropriately combined to form various inventions. For example, some constituent elements may be eliminated from all of the constituent elements in the embodiments.

The respective embodiments and modifications can be combined arbitrarily.

What is claimed is:

1. An ultrasonic sensor, comprising:
    an ultrasonic transmitter that transmits pulse-shaped ultrasonic waves to a thin plate to excite the thin plate;
    three or more ultrasonic receivers disposed on the thin plate, wherein a respective ultrasonic receiver that receives direct waves and reflected waves among the ultrasonic waves propagating in the thin plate excited by the pulse-shaped ultrasonic waves, the direct waves propagating in only the thin plate, and the reflected waves radiating outward, then reflected by an object, and returning to the thin plate; and
    a detector that detects estimates a three-dimensional position of the object present near the thin plate on the basis of a difference between a respective time at which each ultrasonic receiver receives the direct waves and a respective time at which each ultrasonic receiver receives the reflected waves, and a positional relation between the ultrasonic transmitter and each of the three or more ultrasonic receivers.

2. The ultrasonic sensor according to claim 1, wherein the ultrasonic transmitter and at least one of the three or more ultrasonic receivers are disposed on a rear surface of the thin plate.

3. The ultrasonic sensor according to claim 1, wherein at least one of the three or more ultrasonic receivers is disposed on a front surface of the thin plate.

4. The ultrasonic sensor according to claim 1, wherein the ultrasonic transmitter and at least one of the three or more ultrasonic receivers are disposed on a peripheral portion of the thin plate.

5. The ultrasonic sensor according to claim 1, wherein
    the ultrasonic transmitter transmits the pulse-shaped ultrasonic waves having a first frequency and the pulse-shaped ultrasonic waves having a second frequency, and
    the detector detects the object on the basis of a detection result of the object using the pulse-shaped ultrasonic waves having the first frequency and a detection result of the object using the pulse-shaped ultrasonic waves having the second frequency.

6. The ultrasonic sensor according to claim 1, further comprising a signal processor that removes a reference signal indicating a signal caused by a factor other than the object from a signal received by at least one of the three or more ultrasonic receivers and inputs the signal after the removal to the detector.

7. The ultrasonic sensor according to claim 6, further comprising a learning unit that learns the reference signal for each of a plurality of kinds of environments, wherein the signal processor removes the learned reference signal corresponding to a current environment from the signal received by the at least one of the three or more ultrasonic receivers.

8. The ultrasonic sensor according to claim 1, wherein the thin plate is a door of a vehicle.

9. A vehicle control system, comprising:
    the ultrasonic sensor according to claim 1; and
    a vehicle controller that controls a vehicle using a detection result of the ultrasonic sensor.

10. An ultrasonic sensor, comprising:
    an ultrasonic transmitter that transmits pulse-shaped ultrasonic waves to a thin plate to excite the thin plate;
    an ultrasonic receiver that receives direct waves and reflected waves among the ultrasonic waves propagating in the thin plate excited by the pulse-shaped ultrasonic waves, the direct waves propagating in only the thin plate, and the reflected waves radiating outward, then reflected by an object, and returning to the thin plate;
    a detector that detects the object present near the thin plate on the basis of a difference between a time at which the ultrasonic receiver receives the direct waves and a time at which the ultrasonic receiver receives the reflected waves;
    a signal processor that removes a reference signal indicating a signal caused by a factor other than the object from a signal received by the ultrasonic receiver and inputs the signal after the removal to the detector; and
    a learning unit that learns the reference signal for each of a plurality of kinds of environments, wherein the signal processor removes the learned reference signal corresponding to a current environment from the signal received by the ultrasonic receiver.

* * * * *